United States Patent Office 2,724,376
Patented Nov. 22, 1955

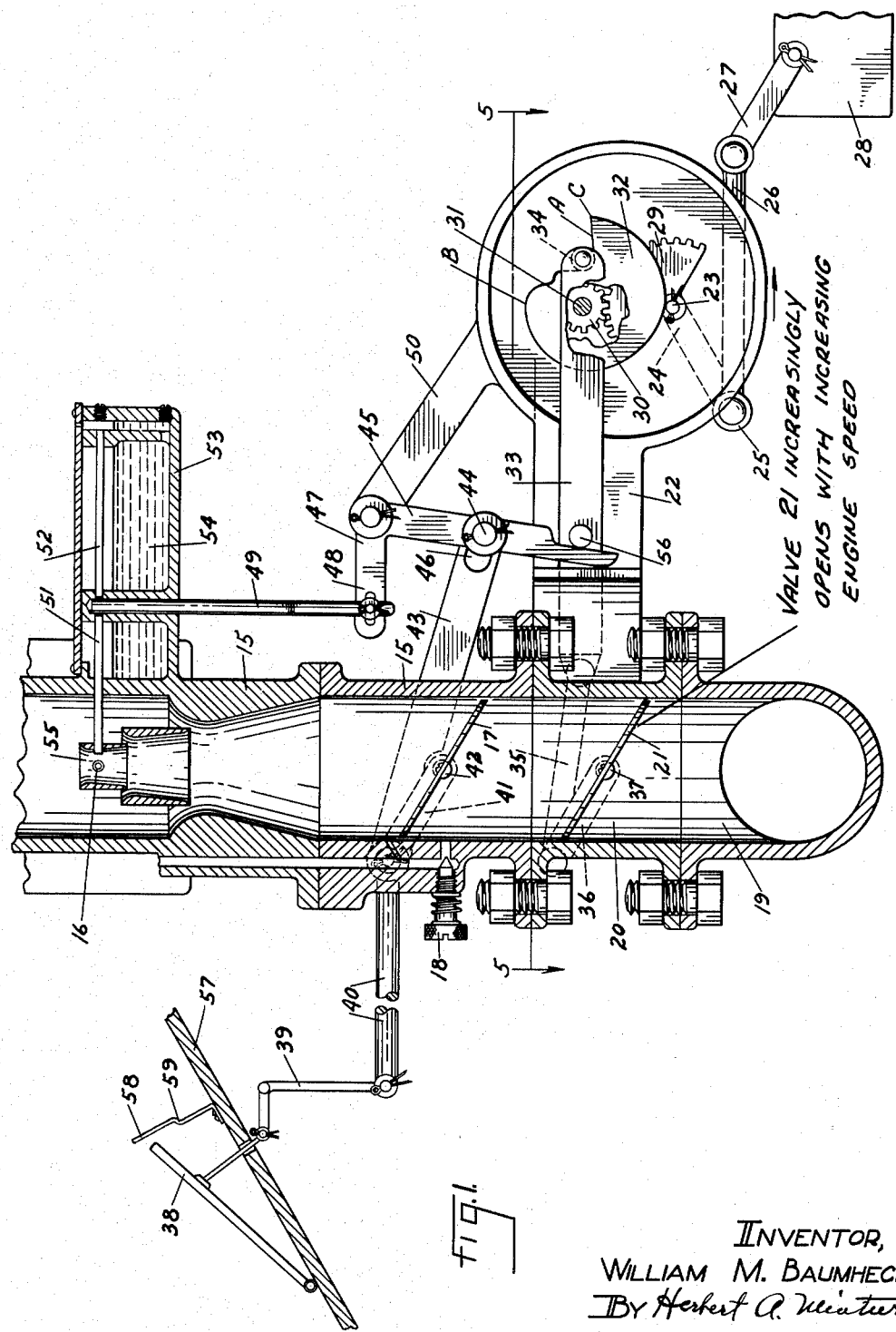

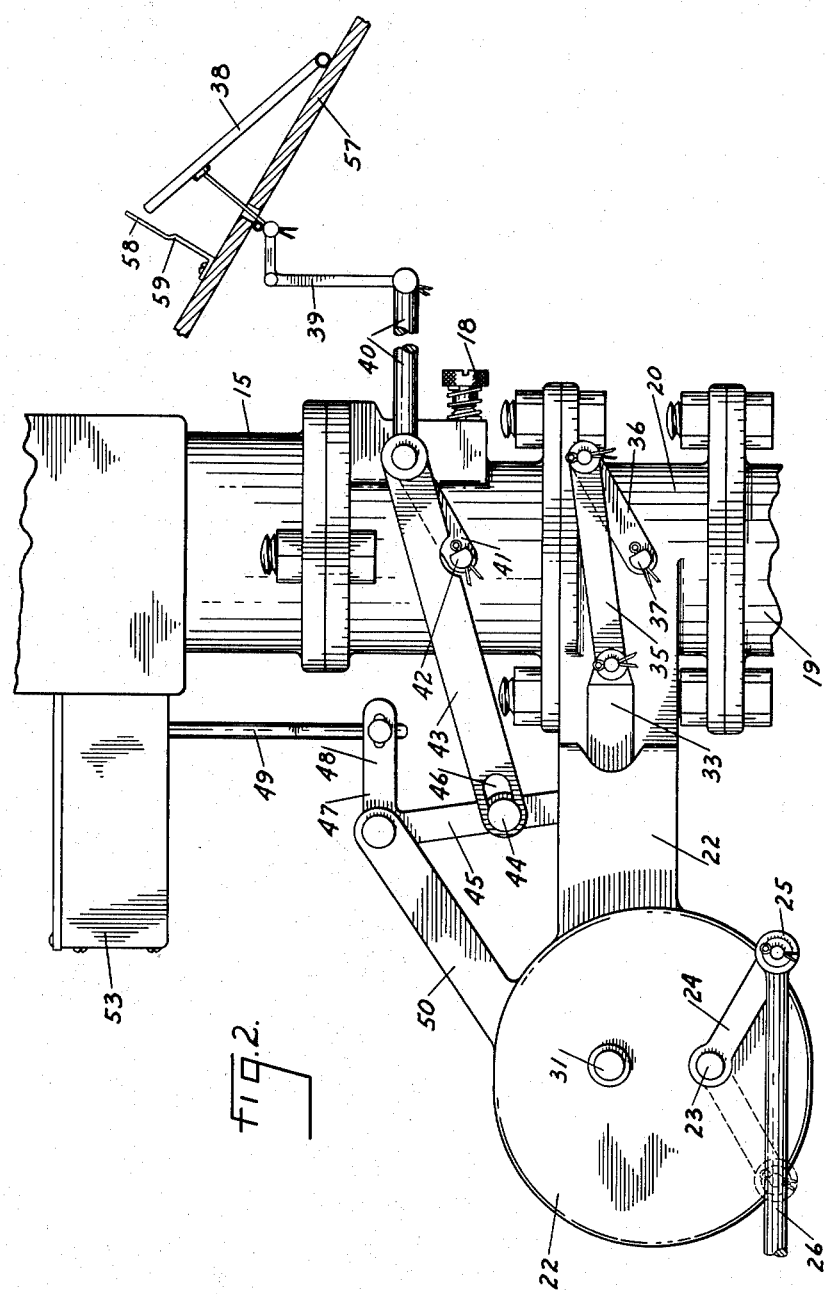

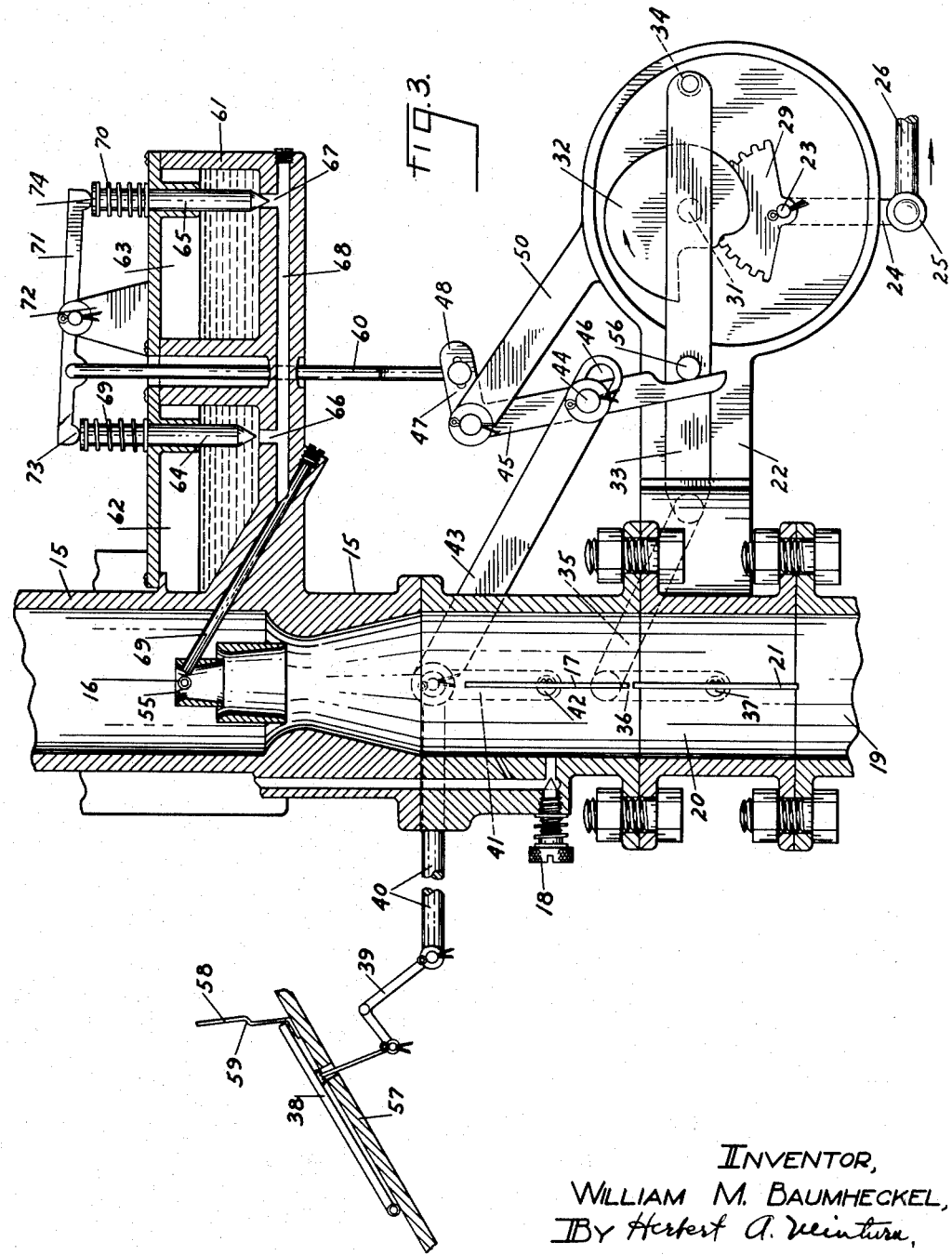

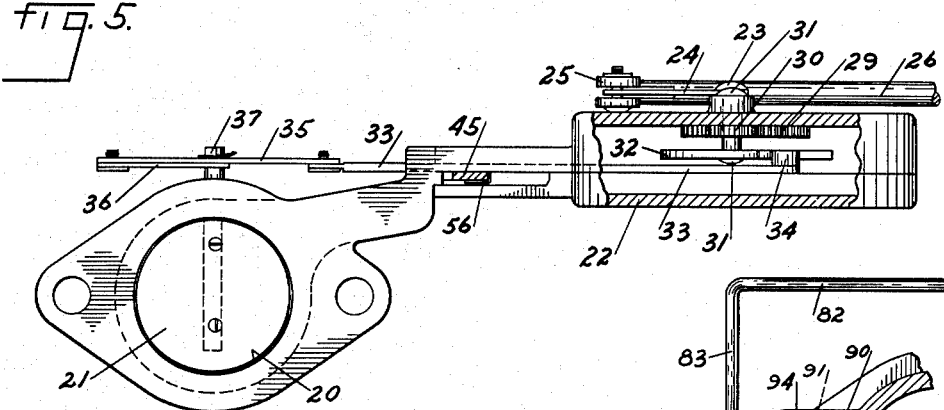
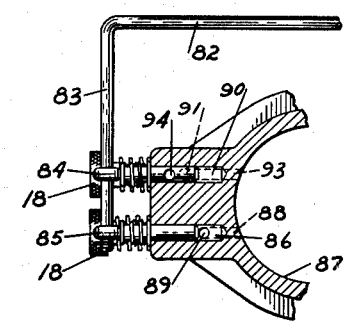
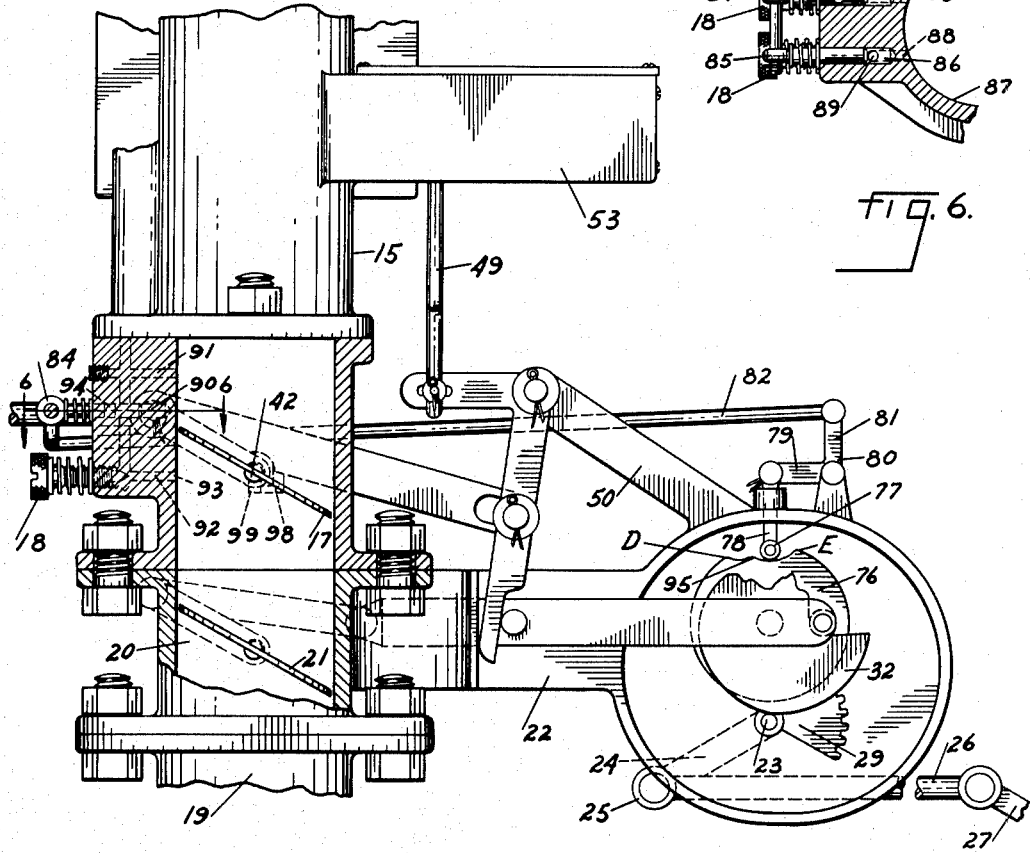
INVENTOR,
WILLIAM M. BAUMHECKEL,
By Herbert A. Minturn
ATTORNEY.

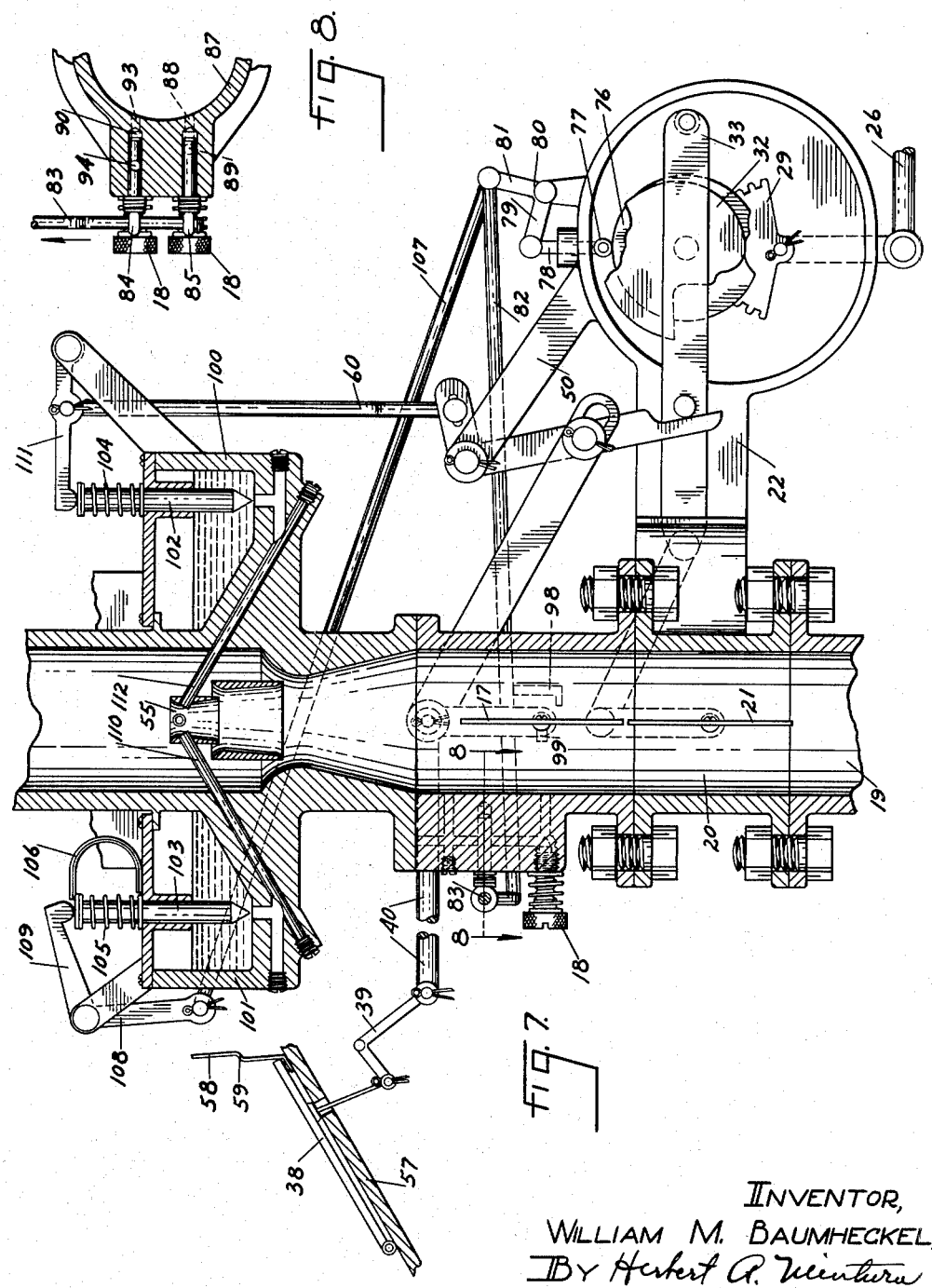

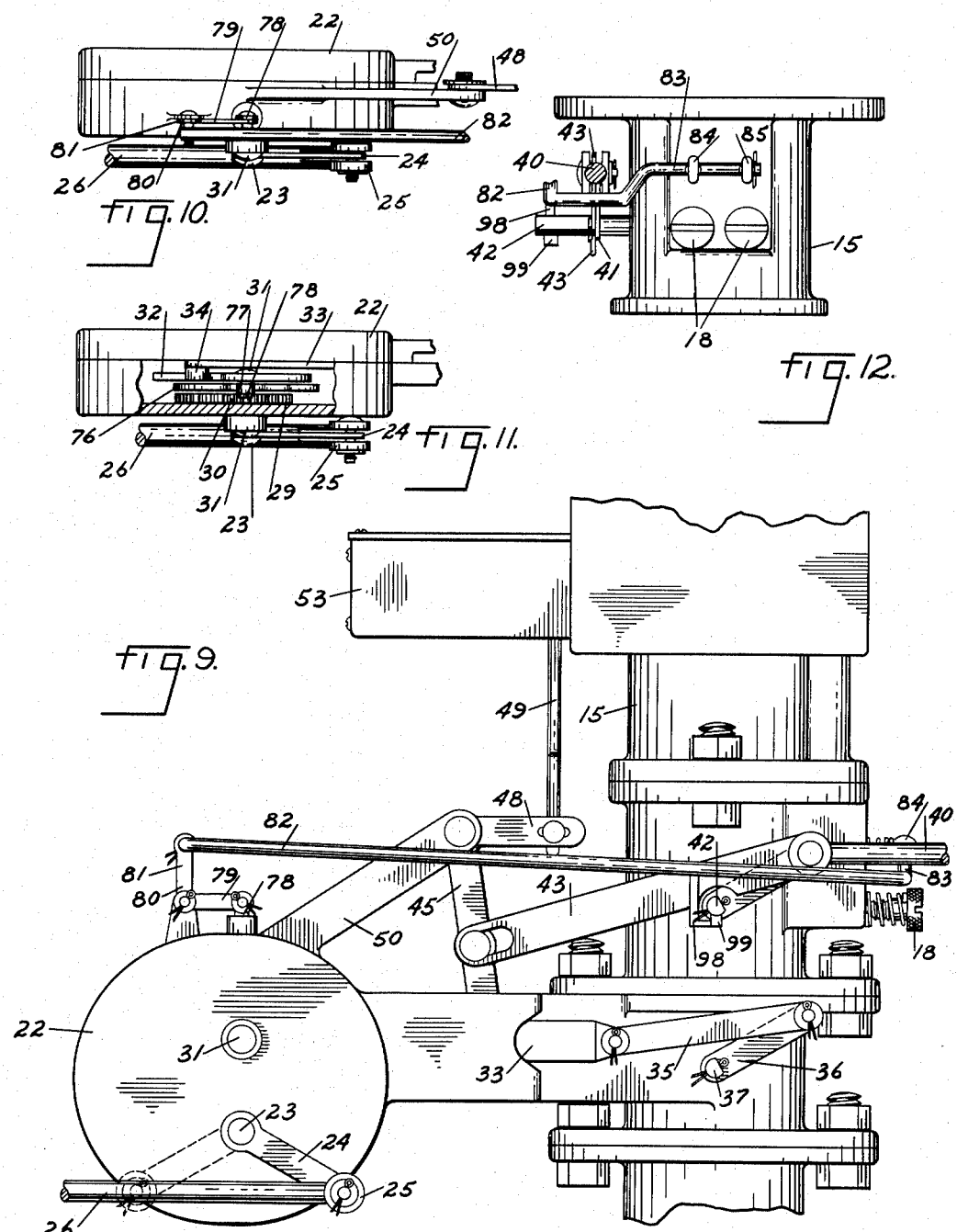

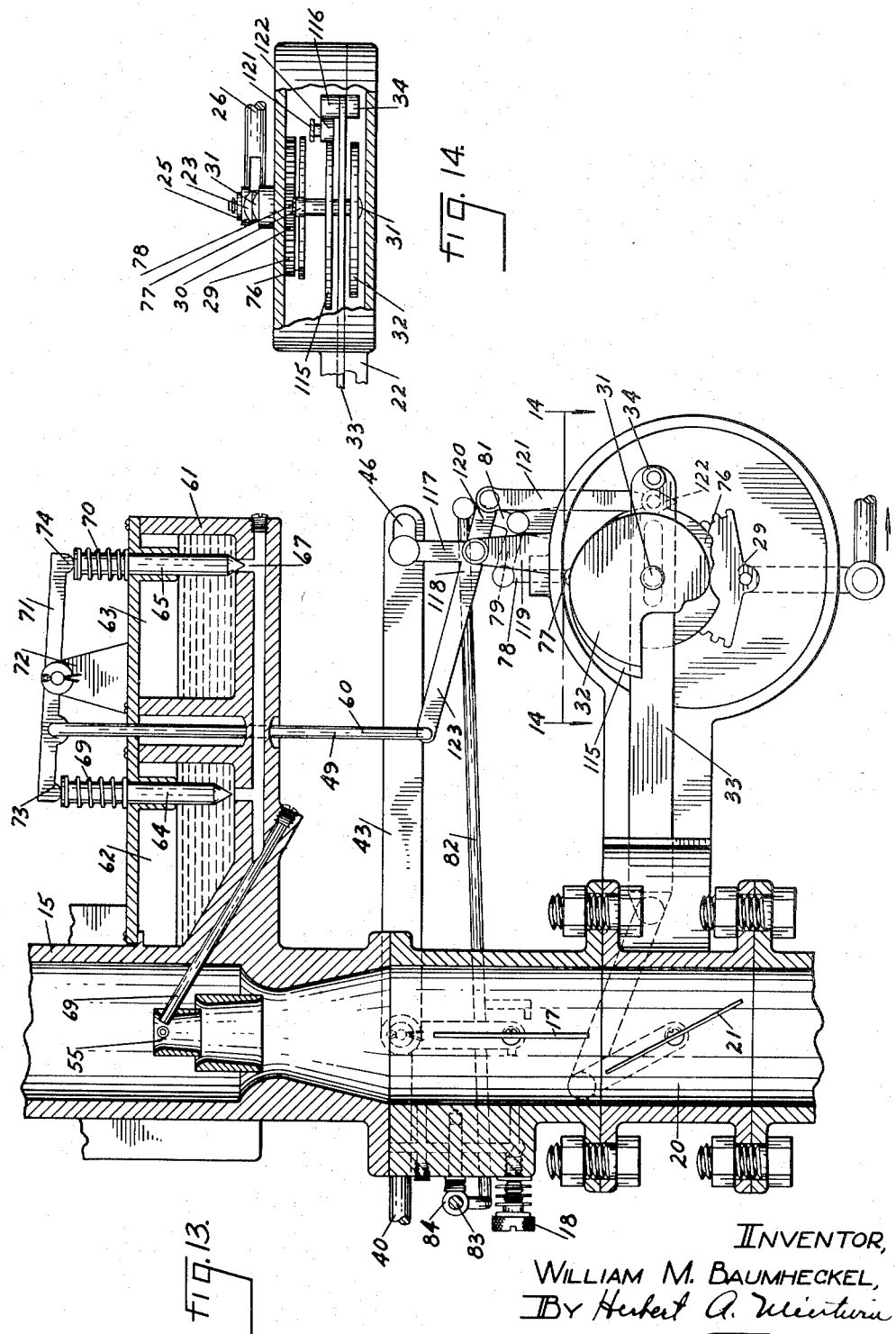

2,724,376

VOLUME CONTROL FOR PREDETERMINED ENGINE COMPRESSION PRESSURES

William M. Baumheckel, Indianapolis, Ind.

Application August 19, 1952, Serial No. 305,261

15 Claims. (Cl. 123—123)

This invention relates to a device for use in conjunction with the carbureting system in high compression ratio automotive engines wherein low octane number fuel may be used while full advantages of the potentialities may be taken of the high-compression engine.

Engine efficiency is being increased by use of higher compression ratios than have heretofore been employed. More efficient engines will require normally higher octane fuels if the present performance standards are to be maintained.

However, automotive engines require fuels of higher octane number only at or near full throttle operation, such for example as during acceleration and hill climbing. Under normal, level road conditions, at substantially uniform speed, the octane number requirement is much lower. The problem has been how to promote the greatest economy by not having to use the higher octane number fuels throughout all ranges of operation between part-throttle and full-load conditions. It is wasteful to have to use the higher octane number fuels at the normal conditions below the full-throttle operation which occurs only at widely spaced apart intervals.

In my device, I utilize the high octane fuel in the high compression engines only when needed, in order to provide not only a considerable saving of the very high octane fuel itself, but also to permit the operation of high compression engines on fuels available at the present time. The refining industry is finding it difficult to increase the octane number of fuels without going to an enormous expenditure in equipment to produce the high octane fuel. By high octane, for the purposes of this disclosure, a rating of one hundred octane number or above is considered to be high while the present day best grade premium gasolines of approximately ninety are considered to be low octane fuels, that is ninety or below.

The octane requirement of an engine will not vary more than two numbers when considered as a function of speed and manifold vacuum. The vacuum created in the intake manifold for any throttle position will increase as the engine speed increases. This is an inherent characteristic of any throttled, spark ignition piston type engine. With increasing higher manifold vacuums associated with increased speed, the octane requirement of the engine decreases with that increased speed. By "high" manifold vacuum is meant a low pressure therein, while a "low" vacuum is meant to indicate a pressure approaching atmospheric.

In attempting to use the low octane number fuels in a high compression engine such as from ten to twelve to one, detonation occurs to the detriment of the engine.

My invention provides means for using an internal combustion engine with a higher compression ratio and a higher compression pressure than can be used with low octane fuels, doing so without detonation.

The invention employs what may be termed a volume controller which controls the amount of fuel mixture entering the engine cylinder to control the compression pressure for the specific given engine speed at the time of the fuel mixture entrance therein, and varying that volume of mixture in accordance with the variation in engine speed range or more properly in connection with the range from closed to open throttle for engine speed control, all at the same time maintaining the maximum compression pressure permissible for the fuel mixture being admitted. The fuel mixture itself will be varied in accordance with the permissible maximum compression pressure. This occurs even though the foot throttle valve at the carburetor is wide open.

The primary purpose of the invention is to use as low an octane number fuel as is compatible with the lowest compression pressure adapted to the particular engine output requirement. The invention provides for means that maintains a safe compression pressure at all different ranges of operations or rather demands of power on the engine for different octane number fuels. In so doing, a great overall saving in fuel cost is obtained upon the basis of miles per gallon of fuel consumed.

On the other hand, the invention involving the volume controller permits full power development of the engine when required, to permit the maximum compression pressure being developed in accordance with mechanical construction of the engine without causing detonation or knock as would otherwise be produced with regular fuel or low octane fuel being used.

At the point of maximum power being required, the fuel characteristic is changed to cause in effect an improvement of octane of the fuel.

It has already been recognized that, as above indicated, only the high octane fuel is required at the full open throttle or highest power demand of the engine. The invention provides for the use of an "octane improver" at this full open throttle or full power demand of the engine by one of two methods, namely an injection of an alcohol-water mixture or the changing over to a higher octane number gasoline. These two mediums are employed only during that full open throttle condition, and the return is promptly made to the lower octane fuel upon the cessation of that demand.

I am fully aware of the fact that both of these methods have been previously employed, but they have not been employed through the use of the mechanism which constitutes the present invention, namely the means for controlling the volume of the fuel mixture independently of the carburetor throttle valve degree of opening and closing. The invention has to do with a mechanical control automatically operating in response to engine speed. The control has nothing to do whatsoever with governing the speed of the engine. To the contrary, the volume controller is responsive to that speed and not the controller of the speed. It is believed that further objects and advantages of the invention will become more apparent by describing the invention in one of the several forms now best known to me as illustrated in the accompanying drawings, in which Fig. 1 is a view in central, vertical section through the discharge end of a carburetor with my invention applied thereto, the various parts being shown in a full throttle closed condition, in a form for feeding anti-detonant;

Fig. 2 is a side elevation of the structure shown in Fig. 1, from a reverse side;

Fig. 3 is a view similar to that shown in Fig. 1 with the parts in a full open throttle condition and showing a form for dual feed of low and high octane fuels;

Fig. 4 is a view in side elevation and partial section of the structure of Fig. 1 plus an idling control;

Fig. 5 is a top plan view in partial section of the volume control mechanism;

Fig. 6 is a view in transverse section on the line 6—6 in Fig. 4;

Fig. 7 is a view in central vertical section through the discharge end portion of a carburetor with my invention incorporated therewith, in a form showing an individual feed of two elements of an anti-detonant;

Fig. 8 is a view in horizontal section on the line 8—8 in Fig. 7;

Fig. 9 is a view similar to Fig. 2 showing in addition an idle control;

Fig. 10 is a detail in top plan view of the volume controller as used in Figs. 7 and 9;

Fig. 11 is a view in top plan and partial section of the volume control shown in Fig. 10;

Fig. 12 is a detail in elevation of the idling control mechanism;

Fig. 13 is a view in vertical central section of a still further modified form of the invention wherein compression pressures may be controlled throughout two separate ranges up to a maximum range; and Fig. 14 is a detail in horizontal section on the line 14—14 in Fig. 13.

Referring to that form of the invention as illustrated in Figs. 1 and 2, the invention is applied for purpose of illustration to a down draft carburetor 15, the lower portion only of which is shown. The structure of the carburetor 15 will be that which is well known to those versed in the art, including the usual fuel float chamber and the other various accessories employed. The details of those particular accessories and the mode of supplying fuel to the jet orifice 16 do not form a part of the invention per se, and therefore are not herein shown, illustrated and described.

The usual speed throttling control butterfly valve 17 is employed, together with the customarily used low speed and idling control adjustable needle valve 18.

Between the lower end of the carburetor 15, below the butterfly valve 17, there is inserted between that carburetor 15 and the intake manifold 19 a valve chamber 20 within which is mounted a butterfly valve 21. This butterfly valve 21 will be hereinafter termed a volume control valve.

Suitably mounted in a relatively rigid position, herein shown as attached to the wall of the chamber 20, is a mechanism for controlling the opening and closing the volume control valve 21.

The bracket 22 which is supported by the chamber 20 extends to one side thereof to revolubly carry in transverse relation thereto a shaft 23 on which is rockably mounted a lever 24. This lever 24 has its outer end portion 25 interconnected through a link 26 to an arm 27 of a device 28 comparable to a speed control governor. The important feature is that the arm 27 will rock in accordance with the speed of the engine to which the device 28 is attached. Since the structure of the device 28 follows that of the customarily used and designed speed control governor, the details are not herein shown or described. With increasing speed of the engine, the link 26 will be carried in the direction of the arrow, Fig. 1. Likewise the link 26 will turn in the opposite direction upon decrease in engine speed.

Fixed to the lever 24 is a gear segment 29 in constant mesh with a spur gear 30 which is revolubly carried by the shaft 31 mounted above the shaft 23 on the bracket 22. A cam 32 is fixed to the shaft 31, the gear 30 likewise being fixed thereto, so that upon rocking of the lever 24, the cam 32 will be revolved about its axis accordingly.

A slide bar 33 is carried by the bracket 22 to have a cam follower 34 in the path of the periphery of the cam 32. This bar 33 extends toward the chamber 20 and has a link 35 rockably connected to its end to in turn be connected rockably with the lever 36 which is fixed to the outer end of the shaft 37 carrying the volume control valve 21.

Since the drawings are in diagrammatic form, some of the inconsequential details are omitted for the sake of clarity in illustrating the invention itself. The slide bar 33 is biased by any suitable means, such as a spring (not shown) to maintain the follower 34 in contact with the periphery of the cam 32 in normal operating conditions.

The usual throttle control, foot pedal 38 is interconnected through suitable linkage 39 to a rod 40 in turn connected to the lever 41 which is presented externally of the carburetor 15 to be fixed to the shaft 42 on which the speed control valve 17 is mounted within the carburetor. A link 43 is rockably connected to the lever 41 and extends over to be connected with a pin 44 carried by an arm 45. The link 43 is provided with a slot 46 through which the pin 44 extends, so that the foot control pedal 38 may be used through a range of downwardly pressed positions to open the valve 17 from its closed position as shown in the drawings, without being stopped by the pin 44, or causing the pin 44 to be shifted to rock the arm 45 accordingly.

This arm 45 is a normally downturned arm of a bell crank lever 47, a horizontal arm 48 of which is interconnected with an upwardly extending rod 49. The bell crank 47 is rockably carried in any suitable means, such as by a fulcrum arm 50 carried by the bracket 22.

The rod 49 extends upwardly to serve by its upper end as a valve to intercept a passage between the tubes 51 and 52 extending across a chamber 53 herein shown as being mounted on the side of the carburetor 15. This chamber 53 is employed as a level control of a supply of an anti-detonant, such as a water-alcohol mixture. The level of this mixture 54 will be controlled in the usual and normal manner by a float (not shown). In any event, when the rod 49 is lowered to provide a continuous passageway from the tube 52 through the tube 51 to its discharge end within the upper Venturi tube 55, the anti-detonant fluid may be drawn into that Venturi tube and thus fed to the carburetor 15 in the usual manner.

Now assuming that the engine to which the carburetor 15 is to be attached to supply fuel in the normal manner is a so-called high compression type wherein the low octane number fuels would tend to knock under wide open throttle conditions, the structure so far described will serve to prevent that knocking or pre-detonating. The engine upon being stopped or under low idling speed conditions will have the volume control valve 21 and the speed control valve 17 in the relative positions as indicated in Fig. 1, wherein the two valves are in their so-called closed positions, it being understood, however, that there is a permissible passageway of fuel mixture around both of those valves into the intake manifold 19 to take care of the low idling speed of the engine.

Now upon speeding up of the engine such as in accelerating, the foot pedal 38 may be depressed sufficiently to cause the arm 45 to be rocked so that when this arm 45 rocks, the lower end thereof will bear against the pin 56 fixed on the bar 33 but only when maximum power of the engine is required, and then the rocker arm 45 will push that bar 33 to the the right as viewed in Fig. 1, so that the volume control valve 21 will be opened accordingly, the valve 17 having been simultaneously opened to permit the fuel to feed through into the intake manifold 19. However, the pedal 38 is normally operated only down to the position of the yieldable stop 59, as will be later explained, so that the volume control valve 21 remains normally under control of the cam 32. This rocking of the cam 32 by pushing against the follower 34 will, through this bar 33, correspondingly rock the volume control valve 21 to varying degrees of opening and closing within the chamber 20. The volume control valve 21 will be rocked to its maximum permissible volume flow position corresponding to each change in speed of the engine.

When the foot pedal 38 is pressed down to that predetermined position of the stop 59, the foot pedal 38 will still be within the limit of travel of not rocking the arm 45, when the engine is operating under its normal load such as for example when the automobile which the engine is driving may be operating upon a level road under constant power requirement.

However, when there is required a sudden need for acceleration, or when the automobile is to be driven up a rather steep incline requiring an appreciable amount of more power and a wider open throttle, the pedal 38 may be pushed on downwardly toward the floor 57 to have the pedal 38 then push through the various members above indicated on the pin 56 to open the volume control valve 21 to a more wide open position, thus operating that control valve independently of the position of the cam follower 34 in reference to the cam 32. It is to be seen though when this condition occurs, also when it occurs in the starting of the engine, if the valve 17 is open sufficiently, that feeding of the low octane number fuel through the jet 55 will tend to produce a detonation in the engine, remembering that the engine is designed to have a compression such that normally a higher-octane number fuel would be required to prevent the detonation. In this situation the valve 49 has opened the passageway between the tubes 51 and 52 in order to permit flow of the anti-detonant 54 into the Venturi 55 to thus permit the normal low octane fuel to operate without detonation even though the engine is operating at the upper permissible limit of its compression pressure.

In order that the operator of the foot pedal 38 may know when it is desirable that the anti-detonant 54 be supplied through the carburetor to the engine some indication is provided. In the form herein shown, there is a device indicated by the spring 58, operating in the manner that the pedal 38 is normally free to be pushed down to a certain position as designated by the offset 59. Further depression of the pedal 38 will require an increased pressure thereagainst to carry the pedal 38 on down over the offset 59 into that range of opening of the throttle 17 wherein the use of the anti-detonant is required.

By use of the volume control valve 21, the high compression engine has its normal operating compression pressures held within the permissible limit of use of the low octane fuel. However, the normal, full power of the engine may be had under the demands for such power by the mechanism adding the anti-detonant to the fuel flow stream only and as when that increased power is required. In other words, the compression pressures permissible within the engine are varied in accordance with the power demand. This variation is accomplished by controlling the volume of air-fuel mixture permitted to enter the engine under the various conditions.

Referring to Fig. 3, a structure is herein shown which will accomplish the same result, only by use of a dual fuel control rather than by the use of the water-alcohol anti-detonant. This particular structure is desirable when there is available a sufficient quantity of the high octane fuel. The high octane fuel in this form is used only at the demand for full power in the high compression engine, the high octane number fuel operating to prevent detonation under such conditions. Normally low octane fuel would be employed up to a predetermined degree of power demand.

The structure shown in Fig. 3 is shown in an operated condition wherein both the throttle valve 17 and the the volume control valve 21 are in their extreme wide open positions. The foot control pedal 38 is down to its lowest position.

A dual fuel control tank 61 is attached to the side of the carburetor 15 to have one chamber 62 wherein high octane fuel is supplied, and a second chamber 63 wherein low octane fuel is supplied. The flow from these chambers 62 and 63 is controlled by valves 64 and 65 respectively entering into outlet passageways 66 and 67 in turn communicating with a common passageway 68 leading to discharge through the jet 69 into the upper Venturi 55.

These valves 64 and 65 are normally biased to open positions by means of their respective springs 69 and 70. A rocker arm 71 is fulcrumed on a bracket 72 to have its respective end portions 73 and 74 be in the paths of the upper ends of the valves 64 and 65 above the tank 61. The rod 60 which is interconnected by its lower end to the bell crank arm 48 extends upwardly and is rockably connected to the rocker arm 71 to one side of the bracket 72, herein shown as on the left hand side, as a means for rocking the member 71 to actuate the valves 64 and 65. With the throttle 17 in the position for full power demand, the rod 60 has been elevated to rock the member 71 to close the valve 65 and allow the valve 64 to remain open so that the low octane number fuel is closed off, and only the high octane number fuel may flow and be discharged through the jet 69.

Upon less power demand, with the volume control valve 21 returning to the control of the travel of the gear segment 29, the rod 60 will be lowered and the valve 64 closed to have the valve 65 open so that the fuel feed to the carburetor is only that of the low octane fuel.

In other words, there is only a feed of high octane fuel to the carburetor when it is required so that the low octane fuel, the fuel which is now commonly available and of lower cost, is used throughout what may be termed normal operating conditions.

The structure shown in Fig. 4 is identical with that shown in Figs. 1 and 2 with the exception that there is added to that Fig. 1 structure an idle speed control.

This idle speed control is initiated through a second cam 76 fixed on the shaft 31. A cam follower 77 follows the contour of the cam 76. This follower 77 is on the lower end of a rod 78 which in turn connects with the arm 79 of a bell crank 80. This bell crank 80 is rockably mounted on the bracket 22 to have an upturned arm 81. From this arm 81 there leads a connecting rod 82 to connect by an end length 83 with two valve members 84 and 85 which horizontally reciprocate under travel of the rod 82 in the body of the carburetor 15. The valve 85 reciprocates in a transverse passageway 86 which opens into the throttle chamber 87 by the orifice 88 mounted below the throttle valve 17 when it is in its closed position. The needle valve 18 normally controls the effective opening through the passageway 86 in the usual and well known manner. However, the low speed and idling speed fuel mixture supply passageway 89 which opens into the transverse passageway 86 may be entirely closed off by sliding the valve 85 across that passageway 89 so that no fuel mixture may then be supplied and discharged through the orifice 88, so long as the engine revolutions per minute are above the predetermined idle speed. Slightly above that idle speed, then the valve 85 opens to supply fuel in preparation for the lesser speed under idling conditions.

The other valve 84 reciprocates in a transverse passageway 90 to intercept a vertically disposed passageway 91 which opens by its upper end into the chamber 87 above the throttle valve 17. The lower end of the passageway 91 is in normal communication with the chamber 87 through the transverse lower end passageway 92 discharging through the orifice 93 below the throttle valve 17. The valve 84 is provided with a vertically disposed transverse passageway 94 therethrough which may register with the vertical passageway 91 when the valve 84 is pushed inwardly of the transverse passageway 90. As illustrated in Fig. 6, the valve 85 is in that position wherein the fuel mixture may be fed through the orifice 88 below the throttle 17 to maintain idling speed of the engine. Also, the valve 84 is in that position where the passageway 94 is out of register with the passageway 91 so that there is no air flowing through that passageway 91 under the idling speed condition. A variation of this setting of the two valves may be had by varying the contour of the cam 76 to provide for "in-between" positioning of these two valves. This is effected by the lobe portion 95, Fig. 4, being provided. Normally, however, when the engine is operating above idling speeds, the cam 76 will have lifted the follower 77 so that the fuel supply passageway 89 is closed and any undue enrichment of the overall fuel supply is thereby avoided. The valve 84 closes off air flow through the passageway 91 when the idle fuel supply valve 85 is open and vice versa.

A foot 98 extends downwardly from the rod 82 to be in the path of a lug 99 which is carried by the shaft 42, the relative location of these two elements 98 and 99 being such that as the cam follower 77 drops to its lowermost zone on the cam 76, the throttle valve 17 is "cracked" open sufficiently to prevent stalling of the engine. As an example, the follower 77 as shown in the position in Fig. 4, would be in that position for a minimum of four hundred revolutions per minute of the engine and then by the contour of the periphery of the cam 76, the valve 17 would be controlled in respect to its opening to provide for sufficient opening to prevent stalling of the engine. This is achieved by the lobe 95 moving to open the throttle valve 17 farther to the non-stalling idle speed position.

It is to be kept in mind that the exact contours of all of the cams to be described herein will vary in accordance with the specific design of the carburetor and also in accordance with the fuel to be normally employed.

In Figs. 7 and 8 there is shown a structure wherein water and alcohol are independently fed in accordance with the power demand and engine speeds. In this structure, there is a separate alcohol bowl 100 and a separate water bowl 101. A valve 102 controls the alcohol feed, and a valve 103 controls the water feed. Normally both valves 102 and 103 are biased to closed conditions by the springs 104 and 105 respectively. In addition, valve 103 is normally maintained in a closed condition by means of a bimetallic thermostat 106 which overcomes the spring 105 when the thermostat 106 is subject to "cold" conditions.

From the idle control bell crank 80, from the arm 81 thereof, there leads a connecting rod 107 to the bell crank 108 adjacent the bowl 101, this bell crank 108 having an arm 109 to be in the path of the upper end of the valve 103. When the throttle valve 17 is in its full open position as indicated in Fig. 7, the rod 107 will operate the bell crank 108 to lift the arm 109 to permit the spring 105 to raise the water valve 103 to its full open position, providing the thermostat 106 permits. As long as the temperature is sufficiently low so as to retain the thermostat 106 in its valve closing condition, the valve 103 will remain closed. This would be the case particularly upon starting the engine so that no water could be fed from the bowl 101 through the jet 110 into the upper Venturi 55. However, when the thermostat 106 becomes sufficiently heated, it will expand and permit the valve 103 to lift and permit the feeding of water when the cam follower 77 is lifted by the cam 76, and the foot throttle 38 is depressed to substantially its lowestmost position to fully open the throttle valve 17. Again, when this throttle valve 17 is approaching its fully open position, the rod 60 will lift a lever arm 111 to permit the valve 102 to lift under the influence of the spring 104 to permit the feeding of alcohol from the bowl 100 through the jet 112 into the Venturi 55. Thus in the maximum power condition, when the throttle valve 17 is fully open, there will be both water and alcohol feeding into the Venturi 55, of course only when the thermostat 106 permits the water feed accordingly.

Therefore in this form as shown in Fig. 7, the water and alcohol are selectively fed depending upon the conditions indicated, but the alcohol is fed in order to take care of the high compression conditions where the higher octane number fuel is required. The alcohol makes up for the extra octane numbers of fuel required over and above the normally low octane fuel being employed with less power demand. Again all of this is accomplished primarily through the volume control valve 21 causing the engine cylinders to be incompletely filled at low power demands thereby lowering the compression pressure for normal operating, but still maintaining the reserve power at high compression pressures when there is a demand for such power, this extra demand being compensated for over and above the low octane fuel by the addition of the alcohol.

The structure illustrated in Figs. 13 and 14 is intended to be applied to an engine which may operate through three different compression ratios. For example, if the engine is designed for an eleven to one compression ratio, that would be too high a ratio to permit use of the best available or rather highest octane rating fuel at the present time. This control structure in Figs. 13 and 14 is designed to have the engine operate in two lower ranges of compression pressure, such as would be encountered in a ten to one compression ratio and in an eight to one compression ratio. This construction of Figs. 13 and 14 is intended to be employed in extremely high compression ratio engines such for example as ratios of eleven to one or even higher. Such ratios require either an exceedingly high octane number fuel which is not commercially available to automobile usage, or is offered at too high a price for normal consumption, or in the absence of using the high number octane, requiring an exceedingly large amount of an anti-detonant which would make the overall operation at the extremely high compression ratio somewhat prohibitive.

Therefore, to offset those difficulties, in the high compression ratio engine the structure is made to be such that the volume control throttle valve 21 is never opened to its full capacity flow through the chamber 20, but is only permitted to be opened up to that position where there will be a ninety per cent of the compression space actually filled with the new charge.

Even with this limitation of the intake volume, an anti-detonant will have to be used. With this volume, however, the engine will be operating normally at the usual power requirements on a high efficiency basis. Then, this construction of Figs. 13 and 14 will also provide for a lower compression pressure range such as eight to one compression ratio, wherein no anti-detonant would have to be employed, and the normal available octane fuel, that is the low octane fuel, can be employed. At this lower range only about seventy per cent of the piston displacement volume will be permitted to enter the cylinder to operate on this eight to one ratio.

Now in order to carry out such operations, there is provided the volume control cam 32 which will control through the range of speeds of the engine a charge volume of up to seventy per cent of the piston displacement as determined by the opening of the volume control valve 21. Then to go into the higher compression pressure, such as in the ten to one ratio, a second cam 115 is employed. A second cam follower 116 is employed, fixed to the bar 33 to be in the path of the second cam 115. This cam 115 is so designed as to its periphery that it will shift the volume control valve 21 toward the full open position to a greater degree than will the cam 32, providing a further step be taken.

This further step is made possible by the following construction wherein the throttle connecting link 43 is interconnected by its end to the crank arm 117 of the crank 118 which is rockably mounted on the post 119. The connecting link 43 is interconnected to the arm 117 through the lost motion provision of the slot 46 so that the foot throttle may be operated to shift the speed control throttle valve 17 up to a certain predetermined degree before the lever 117 may be rocked by further travel of the link 43. This bell crank 118 has an arm 120 from which pivotally extends a link 121 to drop downwardly and carry a wedge-shaped foot 122 which may be inserted between the cam follower 116 and the periphery of the cam 115. The cam 115 is secured to the same shaft 31 on which the cam 32 is fixed. When the engine demands increased power to meet the load, and the foot pedal 38 is pushed downwardly to shift the connecting link 43 to the right sufficiently to rock the crank 118, then the wedge 122 is forced in between the follower 116 and the cam 115 to in turn shift the bar 33 and cause a corresponding degree of rocking of the volume control throttle 21. However, the shape of the cam 115 is made such in conjunction with the width of the member 122 that the valve 21 is never opened to its full position but is only open to that position where a permissible ninety per cent volume of the piston displacement is allowed to enter into the intake manifold 19.

Continuing the construction description, the bell crank 118 has a third arm 123 to which either the rod 49 or 60 is pivotally attached so that when the arm 123 is rocked upwardly as will be the case when the throttle valve 17 approaches its full open position, either the anti-detonant will be fed as indicated in reference to Fig. 1, or the higher octane fuel will be fed as indicated in the illustration of the structure in Fig. 3. In either event, the anti-detonant in the case of the alcohol or in the case of the higher octane fuel will be supplied in exactly the same manner as above indicated. When the throttle 17 is allowed to return to its partially open position instead of the full open position, the wedge member 122 is correspondingly withdrawn, it being understood that it is normally biased to be out of the position between the cam 115 and the follower 116.

In addition, this form of structure also lends itself to the idle control which operates in exactly the same manner as above described, this requiring the use of the third or idle cam 76.

In respect to the contours of the various cams which have been indicated, the cam 32 will have a peripheral portion between the radial surface A and the point B wherein the idling speeds are employed to obtain the safe idling, non-stalling operation of the engine. Then from the point B on around to the point C, the contour is increased in radial spacing from the center of the shaft 31 such as will carry the volume control valve 21 toward the opening position in accordance with speeds ranging from one thousand for example at the point B, increasing gradually around to the point C for the maximum such as around four thousand revolutions per minute. Now these speeds are relative, of course, and will vary depending upon the engine, the specific fuel to be employed, and the characteristics of the carburetor 15. In any event, the cam 32 will be operated responsive to the speed of the engine through the governing device 28 to vary the volume of fuel charge admitted to the engine cylinders in response to the degree of opening of the control valve 21.

The cam 76, which is the idle speed control cam, has a constant radially spaced periphery from the points D around in a counterclock direction to the point E, the control of the idling speed being between those points D and E in the lesser circumferential distance, that is in going from E to D. In other words, beyond the range of speeds which might be termed idling speeds, the follower 77 is then maintained at a constantly spaced distance from the axis of the shaft 31. The cam 115 as used in the form shown in Figs. 13 and 14 will have a periphery which, through the wedge 122, will carry the follower 116 outwardly from the center of the shaft 31 that distance only to the positioning of the valve 21 at the limiting position of ninety per cent piston displacement flow through the chamber 20. The cam 115 through the wedge 122 removes the follower 34 from control of the cam 32.

Thus it is to be seen that my invention accomplishes the desired results through a governor operated by engine speeds for controlling the compression pressure in the engine cylinders through the use of predetermined shaped cams. Even though the engine be designed for extreme compression pressures in compression ratios of eleven to one and higher, the engine may be made to operate on relatively low octane number fuels, and particularly will the maximum power be possibly gained by the use of anti-detonants or by the use of a higher octane fuel, both the anti-detonant and the higher octane fuel being used only in limited quantities. In this manner greater horse power may be obtained for a given amount of fuel consumed.

In employing the term "anti-detonant" I intend to include in that term any of the materials which will effectively increase the octane rating of the overall fuel charged into the intake manifold so as to prevent detonating at the relatively high compression pressures. This term would include not only the alcohols but also the high octane fuels themselves. The reference of course is to employing of the alcohols or the high octane fuels in conjunction with the low octane number fuels. That is, in the one case where the alcohols are used, the alcohols would be additive to the low octane fuels, wherein as in the use of the high octane fuel, the high octane would be used first as a mixture as in the structure shown in Fig. 3, and then to the exclusion of the low octane fuel at the extremely high compression pressures permissable in the operation of the volume controller.

Therefore, while I have described my invention in the best forms as now known to me, doing so in more or less detail, I do not desire to be limited to the precise constructions so illustrated and described since it is obvious that variations in structure may be employed without departing from the spirit of the invention, it being intended that no limitations be imposed upon the invention beyond those required by the following claims.

I claim:

1. The combination with an intake manifold and an engine carburetor having a fuel feed, a speed control throttle valve and a throttle operating member of a fuel mixture volume flow control chamber interposed between said throttle valve and said intake manifold; a valve in said chamber to vary the effective opening therethrough; a cam; governor means to rotate said cam in response to variations in engine speed resulting from operation of said throttle valve; a cam follower; means interconnecting said follower with said chamber valve; said cam having a contour to shift said follower to operate said chamber valve between closed and open positions responsive to a range of speeds from idling to near maximum; an anti-detonant supply chamber; valve means controlling flow of said anti-detonant to said carburetor; and a lost-motion interconnection between said throttle operating member and said valve means, and also said chamber valve; said interconnection being ineffective during its lost motion as to operating said valve means in a predetermined initial range of opening of said throttle valve, and effectively operating said valve means to open condition in a further throttle valve opening range; and said interconnection at the end of its lost motion travel also shifting said chamber valve toward its full open position to a greater degree than permissible by said cam follower when directly acted upon by said cam.

2. The combination with an intake manifold and an engine carburetor having a fuel feed, a speed control throttle valve and a throttle operating member of a fuel mixture volume flow control chamber interposed between said throttle valve and said intake manifold; a valve in said chamber to vary the effective opening therethrough; a cam; governor means to rotate said cam in response to variations in engine speed resulting from operation of said throttle valve; a cam follower; means interconnecting said follower with said chamber valve; said cam having a contour to shift said follower to operate said chamber valve between closed and open positions responsive to a range of speeds from idling to near maximum; an anti-detonant supply chamber; valve means controlling flow of said anti-detonant to said carburetor; and a lost-motion interconnection between said throttle operating member and said valve means, and also said chamber valve; said interconnection being ineffective during its lost motion as to operating said valve means in a predetermined initial range of opening of said throttle valve, and effectively operating said valve means to open condition in a further throttle valve opening range; and said interconnection at the end of its lost motion travel also shifting said chamber valve toward its full open position to a greater degree than permissible by said cam follower when directly acted upon by said cam; and an indicator marking the zone between said ineffective and said effective valve means operation by said interconnection.

3. The combination with an intake manifold and an engine carburetor having a fuel feed, a speed control throttle valve and a throttle operating member of a fuel mixture volume flow control chamber interposed between said throttle valve and said intake manifold; a valve in said chamber to vary the effective opening therethrough; a cam; governor means to rotate said cam in response to variations in engine speed resulting from operation of said throttle valve; a cam follower; means interconnecting said follower with said chamber valve; said cam having a contour to shift said follower to operate said chamber valve between closed and open positions responsive to a range of speeds from idling to near maximum; an anti-detonant supply chamber; valve means controlling flow of said anti-detonant to said carburetor; and a lost-motion interconnection between said throttle operating member and said valve means, and also said chamber valve; said interconnection being ineffective during its lost motion as to operating said valve means in a predetermined initial range of opening of said throttle valve, and effectively operating said valve means to open condition in a further throttle valve opening range; and said interconnection at the end of its lost motion travel also shifing said chamber valve toward its full open position to a greater degree than permissible by said cam follower when directly acted upon by said cam; said supply chamber having two compartments; said valve means consisting of separate valves, one each selectively controlling flow from said compartments to the carburetor; and said interconnection closing one of said valves while the other valve opens.

4. The combination with an engine intake manifold, a carburetor having an engine speed control throttle valve therein, and a throttle valve operating member, of a volume control chamber interposed between said throttle valve and said manifold; a valve in said chamber shiftable to vary the effective volume flow therethrough; a control member shiftable by change in engine speed; a cam rockable by said speed controlled member; a follower shiftable by said cam; means interconnecting said follower with said control valve to shift the control valve in accordance with cam rocking; said cam having a periphery over which said follower rides varying from a minimum height to a maximum height in accordance with required degree of control valve opening through the range of engine operating speeds whereby the volume flow from said carburetor through said chamber will automatically vary in response to said speeds.

5. The combination with an engine intake manifold, a carburetor having an engine speed control throttle valve therein, and a throttle valve operating member, of a volume control chamber interposed between said throttle valve and said manifold; a valve in said chamber shiftable to vary the effective volume flow therethrough; a control member shiftable by change in engine speed; a cam rockable by said speed controlled member; a follower shiftable by said cam; means interconnecting said follower with said control valve to shift the control valve in accordance with cam rocking; said cam having a periphery over which said follower rides varying from a minimum height to a maximum height in accordance with required degree of control valve opening through the range of engine operating speeds whereby the volume flow from said carburetor through said chamber will automatically vary in response to said speeds; and means for further rocking of said control valve upon approach to a wide open throttle valve, said further rocking means comprising a lost motion interconnection between said throttle valve operating member and said cam follower, the limitations of said lost motion interconnection being that said cam follower will operate said volume control valve independently of said interconnection through a predetermined range of engine speeds below maximum throttle valve opening, and will operate said control valve toward a full open condition only upon a throttle valve travel toward full opening independently of said cam follower.

6. The combination with an engine intake manifold, a carburetor having an engine speed control throttle valve therein, and a throttle valve operating member, of a volume control chamber interposed between said throttle valve and said manifold; a valve in said chamber shiftable to vary the effective volume flow therethrough; a control member shiftable by change in engine speed; a cam rockable by said speed controlled member; a follower shiftable by said cam; means interconnecting said follower with said control valve to shift the control valve in accordance with cam rocking; said cam having a periphery over which said follower rides varying from a minimum height to a maximum height in accordance with required degree of control valve opening through the range of engine operating speeds whereby the volume flow from said carburetor through said chamber will automatically vary in response to said speeds; and means for further rocking of said control valve upon approach to a wide open throttle valve, said further rocking means comprising a lost motion interconnection between said throttle valve operating member and said cam follower, the limitations of said lost motion interconnection being that said cam follower will operate said volume control valve independently of said interconnection through a predetermined range of engine speeds below maximum throttle valve opening, and will operate said control valve toward a full open condition only upon a throttle valve travel toward full opening independently of said cam follower; a bowl interconnecting by a flow passage with and adjacent to said carburetor to hold an anti-detonant fluid; a bowl to carburetor flow control valve normally closed; and a bowl to carburetor flow control valve operating system actuated to valve open condition through travel of said throttle valve operating member to supply the anti-detonant to the carburetor only upon substantially full throttle valve opening.

7. The combination with an engine intake manifold, a carburetor having an engine speed control throttle valve therein, and a throttle valve operating member, of a volume control chamber interposed between said throttle valve and said manifold; a valve in said chamber shiftable to vary the effective volume flow therethrough; a control member shiftable by change in engine speed; a cam rockable by said speed controlled member; a follower shiftable by said cam; means interconnecting said follower with said control valve to shift the control valve in accordance with cam rocking; said cam having a periphery over which said follower rides varying from a minimum height to a maximum height in accordance with required degree of control valve opening through the range of engine operating speeds whereby the volume flow from said carburetor through said chamber will automatically vary in response to said speeds; and means for further rocking of said control valve upon approach to a wide open throttle valve, said further rocking means comprising a lost motion interconnection between said throttle valve operating member and said cam follower, the limitations of said lost motion interconnection being that said cam follower will operate said volume control valve independently of said interconnection through a predetermined range of engine speeds below maximum throttle valve opening, and will operate said control valve toward a full open condition only upon a throttle valve travel toward full open independently of said cam follower; a bowl interconnecting by a flow passage with and adjacent to said carburetor to hold an anti-detonant fluid; a bowl to carburetor flow control valve normally closed; and a bowl to carburetor flow control valve operating system actuated to valve open condition through travel of said throttle valve operating member to supply the anti-detonant to the carburetor only upon substantially full throttle valve opening; said cam having a contour to actuate said follower through a range of volume control valve openings to restrict the volume flow therepast to a predetermined maximum engine compression pressure; a second cam rocked by said speed controlled shiftable member actuating said volume control valve in a range of greater volume flow therepast to provide a higher predetermined maximum engine compression pressure.

8. The combination with an engine intake manifold, a carburetor having an engine speed control throttle valve therein, and a throttle valve operating member, of a volume control chamber interposed between said throttle valve and said manifold; a valve in said chamber shifttble to vary the effective volume flow therethrough; a control member shiftable by change in engine speed; a cam rockable by said speed controlled member; a follower shiftable by said cam; means interconnecting said follower with said control valve to shift the control valve in accordance with cam rocking; said cam having a periphery over which said follower rides varying from a minimum height to a maximum height in accordance with required degree of control valve opening through the range of engine operating speeds whereby the volume flow from said carburetor through said chamber will automatically vary in response to said speeds; an idling speed control cam rocked by said speed shiftable member; a follower for said last cam; an idle speed fuel flow control valve and a connection between said idle valve and said idle cam follower to actuate said valve under rocking of the idle cam.

9. The combination with an engine intake manifold, a carburetor having an engine speed control throttle valve therein, and a throttle valve operating member, of a volume control chamber interposed between said throttle valve and said manifold; a valve in said chamber shiftable to vary the effective volume flow therethrough; a control member shiftable by change in engine speed; a cam rockable by said speed controlled member; a follower shiftable by said cam; means interconnecting said follower with said control valve to shift the control valve in accordance with cam rocking; said cam having a periphery over which said follower rides varying from a minimum height to a maximum height in accordance with required degree of control valve opening through the range of engine operating speeds whereby the volume flow from said carburetor through said chamber will automatically vary in response to said speeds; an idling speed control cam rocked by said speed shiftable member; a follower for said last cam; an idle speed fuel flow control valve and a connection between said idle valve and said idle cam follower to actuate said valve under rocking of the idle cam; and a member carried by said idle valve-to-idle cam connection, shiftable therewith to maintain said throttle valve at an engine non-stalling degree of opening in a low range of engine idling speeds.

10. The combination with an engine intake manifold, a carburetor having an engine speed control throttle valve therein, and a throttle valve operating member, of a volume control chamber interposed between said throttle valve and said manifold; a valve in said chamber shiftable to vary the effective volume flow therethrough; a control member shiftable by change in engine speed; a cam rockable by said speed controlled member; a follower shiftable by said cam; means interconnecting said follower with said control valve to shift the control valve in accordance with cam rocking; said cam having a periphery over which said follower rides varying from a minimum height to a maximum height in accordance with required degree of control valve opening through the range of engine operating speeds whereby the volume flow from said carburetor through said chamber will automatically vary in response to said speeds; a second cam rockable by said speed controlled member; a cam follower shiftable by said second cam and interconnected with said volume control valve; a spacer mounted for travel between and withdrawal from between said second cam and its follower; a lost motion connection between said throttle valve operating member and said spacer, the limitations of said lost motion connection being that said throttle valve may be operated without entering said spacer between the second cam and its follower during the normal range of volume control valve travel induced by said first cam, and said spacer will be entered between the second cam and its follower upon wide opening of the throttle valve to open said volume control valve to its predetermined opened position irrespective of said first cam opening thereof.

11. The combination with an engine intake manifold, a carburetor having an engine speed control throttle valve therein, and a throttle valve operating member, of a volume control chamber interposed between said throttle valve and said manifold; a valve in said chamber shiftable to vary the effective volume flow therethrough; a control member shiftable by change in engine speed; a cam rockable by said speed controlled member; a follower shiftable by said cam; means interconnecting said follower with said control valve to shift the control valve in accordance with cam rocking; said cam having a periphery over which said follower rides varying from a minimum height to a maximum height in accordance with required degree of control valve opening through the range of engine operating speeds whereby the volume flow from said carburetor through said chamber will automatically vary in response to said speeds; a second cam rockable by said speed controlled member; a cam follower shiftable by said second cam and interconnected with said volume control valve; a spacer mounted for travel between and withdrawal from between said second cam and its follower; a lost motion connection between said throttle valve operating member and said spacer, the limitations of said lost motion connection being that said throttle valve may be operated without entering said spacer between the second cam and its follower during the normal range of volume control valve travel indicated by said first cam, and said spacer will be entered between the second cam and its follower upon wide opening of the throttle valve to open said volume control valve to its predetermined opened position irrespective of said first cam opening thereof; an idle engine speed control cam actuated by said speed controlled member; an idle speed control valve; and means interconnecting said idle cam and said idle control valve.

12. For operating on low octane fuels, a high compression, carburetor fuel supplied engine at maximum fuel economy under non-detonating conditions, the combination with a carburetor having a throttle valve and an engine fuel flow intake, a volume control valve between said throttle valve and said intake; means responsive to engine speeds to open said volume control valve to a volume flow therepast for a predetermined non-detonating limited engine compression pressure; means for further opening of said volume control valve simultaneously with opening of said throttle valve to create a maximum pressure above said limited pressure; and throttle valve travel actuated means supplying an anti-detonant to said intake under the opening of the volume control valve for said maximum pressure.

13. The combination with a high compression engine, an anti-detonant storage vessel, a normal fuel feeding carburetor having a throttle valve with an operating member, and an engine fuel intake passageway leading from the carburetor to the engine, of means for limiting flow of fuel mixture from the carburetor to the engine to that volume of normal fuel mixture which provides the maximum engine compression pressure short of detonation at each engine speed throughout the range thereof from closed throttle to a predetermined degree of open throttle and providing a flow of higher anti-detonant fuel mixture for throttle valve opening above said degree; said means comprising an engine driven device responsive to speed of the engine; an intake volume control valve in said passageway between said throttle valve and the engine; means interconnecting said device with and rocking said volume control valve into increasingly open positions with an increase of engine speed up to and maintaining a predetermined degree of opening short of full intake volume opening; means interconnecting said volume control valve with said throttle valve operating member for increased opening therewith in the range of travel of said member in opening the throttle valve for power demand above said predetermined volume control valve opening; means controlling flow of said anti-detonant to said carburetor; and means interconnecting said throttle opening member and said anti-detonant flow controlling member to set up flow of the anti-detonant in said range of travel of the operating member.

14. The structure of claim 13 in which said volume control valve rocking means comprises two shifting members operated by said device, one shifting member opening said volume control valve to a position intermediate of said predetermined limit of engine intake volume, and the second shifting member further opening the volume control valve to said predetermined intake volume limit.

15. In a speed controlled device for maintaining an engine at low idle speed and preventing engine stalling, the combination of a carburetor having a throttle valve and low and idling speed fuel mixture passageways, one passageway opening into the carburetor chamber above the throttle valve and the other passageway opening below the throttle valve; a valve in each of said passageways; an engine driven speed responsive device reflecting engine speeds; means comprising a shiftable member in said device moving in response to approach of the engine speed to a predetermined idle speed opening said second valve and closing said first valve, said member moving to close said second valve then open said first valve upon engine speed increase from the idle speed; and means interconnecting said member with said throttle to shift the throttle toward opening upon an engine decrease in speed below said predetermined idle speed.

References Cited in the file of this patent

UNITED STATES PATENTS

| | | |
|---|---|---|
| 1,598,243 | Chapin | Aug. 31, 1926 |
| 2,513,773 | Anderson | July 4, 1950 |